United States Patent Office 3,637,698
Patented Jan. 25, 1972

3,637,698
HALO-SULFAMYLSPIRO- AND DIALKYL-QUINAZOLINONES
Bola Vithal Shetty, Rochester, N.Y., assignor to Pennwalt Corporation
No Drawing. Filed Mar. 11, 1968, Ser. No. 711,855
Int. Cl. C07d 51/48
U.S. Cl. 260—256.5 R      11 Claims

ABSTRACT OF THE DISCLOSURE

A 7'halo-6'-sulfamylspiro- or dialkyl-4,2'(1'H)-quinazolin-4'(3'H)-one, having the spiro group in the 2-position, hydrogen or alkyl in the 3-position, and hydrogen, alkyl, amino, halogen or haloloweralkyl in the 5- and 8-positions. The hydrogens of the sulfamyl group may be substituted by alkyl or phenylalkyl or together form a carbocyclic or heterocyclic ring. The spiro group can be composed entirely of carbon atoms or can contain one or more hetero atoms, especially sulfur, nitrogen or oxygen. The compounds are useful in diuretics and saluretics.

---

The invention relates to spiro or dialkyl quinazolinone compounds having diuretic properties, and more particularly to 7'halo or 7'trifluoromethyl-6'-sulfamyl (substituted or unsubstituted) spiro - 4,2'(1'H) - quinazolin-4'(3'H) ones having the spiro group in the 2-position.

The preferred compounds of the invention are of the following general formula:

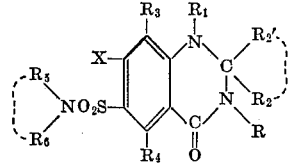

$R_2$ and $R_2'$ are loweralkyl or together form with the 2-carbon atom to which they are attached, a spiro-aliphatic group that can be composed entirely of carbon atoms or can contain one or more hetero atoms especially sulfur, nitrogen or oxygen, and can be substituted or unsubstituted, especially alkyl or halo substituted; the carbocyclic or heterocyclic group containing preferably not more than 10 carbon atoms;
R is hydrogen, or loweralkyl;

$R_3$ and $R_4$ are hydrogen, loweralkyl, loweralkoxy, amino, loweralkylamino, halogen or halogen substituted loweralkyl;
X is halogen or trifluoromethyl;
$R_5$ is hydrogen, loweralkyl or phenylloweralkyl;
$R_6$ is hydrogen or loweralkyl, or
$R_5$ and $R_6$ together form a carbocyclic ring such as cyclopropyl, cyclobutyl, or a heterocyclic ring such as piperidino, morpholino, pyrolidino;
$R_1$ is hydrogen, lower alkyl, or phenylloweralkyl.

The following examples illustrate compounds of the invention:

7'-chloro-1-methyl-6'-methylaminosulfonyl-3'-o-tolyl-spiro [piperidine-4,2'(1'H)-quinazolin]-4'(3'H)-one.
7'-chloro-1,1'-dimethyl-6'-sulfamylspiro[piperidine-4,2'(1'H)-quinazolin]-4'-(3'H)-one.
7'-chloro-1-methyl-6'-methylaminosulfonylspiro [piperidine-4,2'(1'H)-quinazolin]4'(3'H)-one.
7'-chloro-6'-methylaminosulfonylspiro [cyclopentane-1,2'(1'H)-quinazolin]-4'(3'H)-one.
2,2-dimethyl-6-sulfamyl-7-chloro-1,2,3,4-tetrahydro-4(3H)-quinazolinone.
2-ethyl-2-methyl-6-sulfamyl-7-chloro-1,2,3,4-tetrahydro-4(3H)-quinazolinone.
7'-chloro-6'-sulfamylspiro [cyclopentane-1,2'(1'H)-quinazolin]-4'(3'H)-one.
7'-chloro-6'-sulfamylspiro [cyclohexane-1,2'(1'H)-quinazolin]-4'(3'H)-one.
7'-chloro-1-methyl-6'-sulfamylspiro [piperidine-4,2'(1'H)-quinazolin]-4'(3'H)-one.
2-methyl-2-chloromethyl-6-sulfamyl-7-chloro-1,2,3,4-tetrahydro-4(3H)-quinazolinone.
2,2-dimethyl-6-sulfamyl-7-trifluoromethyl-1,2,3,4-tetrahydro-4(3H)-quinazolinone.
2-carbethoxymethyl-2-methyl-6-sulfamyl-7-chloro-1,2,3,4-tetrahydro-4(3H)-quinazolinone.
2-acetyl-2-methyl-6-sulfamyl-7-chloro-1,2,3,4-tetrahydro-4(3H)-quinazolinone.
4,7'-dichloro-6'-sulfamylspiro [cyclohexane-1,2'(1'H)-quinazolin]-4'(3'H)-one.
7' - chloro - 2 - methyl-6'-sulfamylspiro [cyclohexane-1,2'(1'H)-quinazolin]-4'(3'H)-one.

The following table gives compounds which also illustrate the diuretic compounds of this invention:

Me=methyl
Et=ethyl
Ph=phenyl

| $R_1$ | $R_2$ | $R'_2$ | $R_3$ | X | $R_5$ | $R_4$ | $R_6$ | R |
|---|---|---|---|---|---|---|---|---|
| H | –⟨phenyl-Cl⟩ | H | H | Cl | H | H | H | Me |
| H | –⟨phenyl-Cl⟩ | H | H | Cl | H | H | H | H |
| H | –⟨phenyl⟩–Cl | H | H | Cl | H | H | H | H |
| H | –⟨phenyl-Cl⟩ | Me | H | Cl | H | H | H | H |
| H | –⟨phenyl-Cl⟩ | Et | H | Cl | H | H | H | H |

| R₁ | R₂ | R'₂ | R₃ | X | R₅ | R₄ | R₆ | R |
|---|---|---|---|---|---|---|---|---|
| H | —C₆H₄—F | H | H | Cl | H | H | H | H |
| H | —C₆H₄—I | H | H | Cl | H | H | H | H |
| H | —C₆H₄—Br | H | H | Cl | H | H | H | H |
| H | Me | Me | OH | Cl | H | H | H | H |
| H | Me | Me | OMe | Cl | H | H | H | H |
| H | Me | Me | NH₂ | Cl | H | H | H | H |
| H | Me | Me | NH₂ | F | H | H | H | H |
| H | Me | Me | NH₂ | F | Me | H | H | H |
| H | —(CH₂)₃— | | H | Cl | H | H | H | Me |
| H | —(CH₂)₄— | | H | Cl | H | H | H | H |
| H | —(CH₂)₅— | | H | Cl | H | H | H | H |
| H | —(CH₂)₆— | | H | Cl | H | H | H | H |
| H | —(CH₂)₇— | | H | Cl | H | H | H | H |
| H | —(CH₂)₈— | | H | Cl | H | H | H | H |
| H | —(CH₂)₉— | | H | Cl | H | H | H | H |
| Me | —(CH₂)₅— | | H | Cl | H | H | H | H |
| Me | —(CH₂)₅— | | OH | Cl | H | H | H | H |
| Me | —(CH₂)₅— | | OMe | Cl | H | H | H | H |
| Me | —(CH₂)₅— | | NH₂ | Cl | H | H | H | H |
| Me | —(CH₂)₅— | | H | F | H | H | H | H |
| Me | —(CH₂)₅— | | H | F | Me | H | H | H |
| Me | —(CH₂)₅— | | H | Cl | Me | H | H | H |
| Me | —(CH₂)₅— | | NH₂ | Cl | Me | H | H | H |
| H | —CH₂CH₂N(Me)—CH₂CH₂— | | H | Cl | H | H | H | H |
| H | —CH₂CH₂N(Ph)—CH₂CH₂— | | H | Cl | H | H | H | H |
| H | —CH₂CH₂N(H)—CH₂CH₂— | | H | Cl | H | H | H | Me |
| H | —CH₂N(Me)—CH₂CH₂— | | H | Cl | H | H | H | H |
| H | —CH₂N(Ph)—CH₂CH₂— | | H | Cl | H | H | H | H |
| H | —CH₂N(H)—CH₂CH₂— | | H | Cl | H | H | H | Me |
| H | —CH₂CH₂N(Me)—(CH₂)₃— | | H | Cl | H | H | H | H |
| H | —CH₂CH₂NH(CH₂)₃— | | H | Cl | H | H | H | H |
| H | —CH₂CH₂N(Ph)—(CH₂)₃— | | H | Cl | H | H | H | H |
| Me | —CH₂CH₂N(Me)—CH₂CH₂— | | H | Cl | H | H | H | H |
| H | —CH₂CH₂N(Me)—CH₂CH₂— | | H | Br | H | H | H | H |
| H | —CH₂CH₂N(Me)—CH₂CH₂— | | H | F | H | H | H | H |
| Me | —CH₂CH₂N(Me)—CH₂CH₂— | | H | F | H | H | H | H |
| H | —CH₂CH₂N(Me)—CH₂CH₂— | | H | Cl | Me | H | H | H |
| H | —CH₂CH₂N(Me)—CH₂CH₂— | | NH₂ | Cl | H | H | H | H |
| H | —(CH₂)₅— | | NHMe | Cl | H | H | H | H |
| H | —(CH₂)₅— | | NMe₂ | Cl | H | H | H | H |
| H | —(CH₂)₅— | | Cl | Cl | H | H | H | H |
| H | —(CH₂)₅— | | H | Cl | H | OMe | H | H |
| H | —(CH₂)₅— | | H | Cl | H | Me | H | H |
| H | —(CH₂)₅— | | H | Cl | H | NH₂ | H | H |
| H | —(CH₂)₅— | | H | Cl | H | NHMe | H | H |
| H | —(CH₂)₅— | | H | Cl | H | NMe₂ | H | Me |
| H | —(CH₂)₅— | | H | Cl | H | Cl | H | H |
| H | —(CH₂)₅— | | H | Cl | Me | Cl | Me | H |
| H | —(CH₂)₅— | | H | Cl | PhCH₂ | Cl | H | H |
| H | —(CH₂)₅— | | H | Cl | (1) | Cl | (1) | Et |
| H | —(CH₂)₅— | | H | Cl | (2) | Cl | (2) | H |
| H | —(CH₂)₅— | | H | Cl | (3) | Cl | (3) | H |

[1] Any of the above in which R₅ and R₆ together = —(CH₂)₅—.
[2] Any of the above in which R₅ and R₆ together = —CH₂CH₂OCH₂CH₂—.
[3] Any of the above in which R₅ and R₆ together = —(CH₂)₄—.

The following examples are given to illustrate the preparation of compounds of this invention. Other compounds of this invention than those specifically shown can be prepared by modifications well known to the art. Also compounds of this invention may be made by modifications of the method shown in my application Ser. No. 517,995, now Pat. 3,360,518, as will also be apparent.

EXAMPLE 1

Preparation of 7'-chloro-6'-sulfamylspiro[cyclopentane-1,2'(1'H)-quinazolin]-4'(3'H)-one Synthetic route:

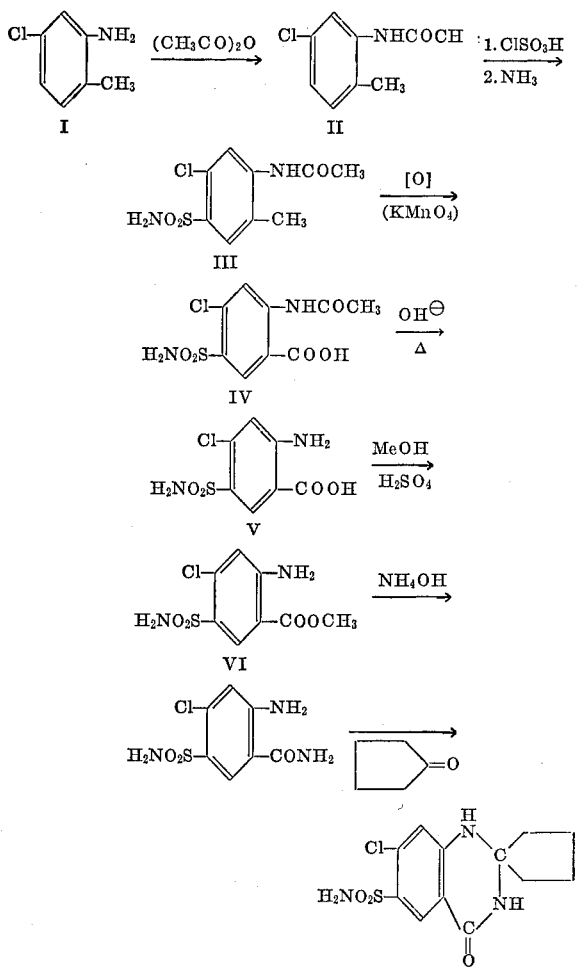

Preparation of 5-chloro-2-methylacetanilide, II 5-chloro-o-toluidine (I), (1000 gm.) was added to 9000 ml. of water, preheated to 35°, in a 4½ gallon battery jar. The slurry was vigorously stirred while 1260 gm. acetic anhydride was carefully added. Stirring was continued for four hours, then the product was filtered off and air dried. The crude product was recrystallized from 7500 ml. of benzene, using 40 gm. charcoal to remove some colored material. The product was air dried. It weighed 818 gm. and melted at 138–139°. This lot was combined with the material from lot numbers, 741-811, 741-859, 741-874, 745-612, 741-994, and 740-482. The total weight was 11 kg. from 10.4 kg. of starting material.

Preparation of 5-chloro-2-methyl-4-sulfamylacetanilide, III

Chlorosulfonic acid (1000 gm.) was placed in a nitrogen flushed 5 liter, 3 neck round bottom flask fitted with a stirrer and a calcium chloride tube. 5-chloro-2-methylacetanilide (300 gm.) was cautiously added to the chlorosulfonic acid, and then 88 gm. sodium chloride was added portionwise over one hour. The reaction mixture was cautiously raised to 80° C. (foaming occurs). When the foaming had subsided, the temperature was raised to 92° C. and held there for three hours. The hot reaction mixture was added slowly with good agitation to 4000 ml. of acetone and 1500 gm. of ice. The resulting slurry was diluted with water to a total volume of 8000 ml. and the crude sulfonyl chloride was filtered off and washed with water. The damp filter cake was added to 3000 ml. of concentrated ammonium hydroxide, stirred at room temperature for one hour and then heated to 50° C. for two hours. The slurry was cooled, filtered, washed with water and air dried. The weight of product was 186 gm. It melted at 248–250°. This material was combined with that made in runs 741–863, 741–886, 747–505, 747–507, 747–903, and 745–647. The total weight of product was 4 kg. from 11 kg. starting material.

Preparation of N-acetyl-4-chloro-5-sulfamyl anthranilic acid, IV

Into a 12 liter flask was introduced 8000 ml. water, 1144 gm. magnesium sulfate heptahydrate and 400 gm. 5-chloro-2-methyl-4-sulfamylacetanilide. The mixture was heated to 80° and 710 gm. potassium permanganate was added portionwise with good stirring over about four hours at 80–85°. The mixture was kept at 80–85° for three hours after the permanganate addition was completed and then it was filtered hot. The manganese dioxide cake was washed with three 1000 ml. portions of water.

The filtrate was made acid with 200 ml. concentrated hydrochloric acid, filtered, washed with water and air dried. The crude product was combined with the crude product obtained from runs 743–858, 747–552, 742–237, 745–685, 747–529, and 740–245, giving a total weight of 2833 gm. This material was dissolved, (under Lot No. 745–687) in 100 liters of 95% ethanol. The resulting solution was concentrated to a total volume of 10 liters, periodically filtering off the product that had crystallized out and washing this with 95% ethanol. The yield of purified product was 2500 gm. melting at 264–266°, from 3 kg. of starting material.

Preparation of 4-chloro-5-sulfamylanthranilic acid, V

N-acetyl-4-chloro-5-sulfamylanthranilic acid (2500 gm.) was refluxed for three hours in 15,000 ml. 3 N sodium hydroxide solution, then brought to a pH of four with concentrated hydrochloric acid. After allowing it to cool to about 70°, the product was filtered off and washed with water. The wet product was dissolved in 200 liters of boiling water, filtered hot and allowed to cool. When filtered, washed with water and air dried, the product weighed 2000 gm. and melted at 275–276°.

Preparation of methyl-4-chloro-5-sulfamylanthranilate, VI 4-chloro-5-sulfamylanthranilic acid (200 gm.) was refluxed 24 hours in 2 liters methanol and 100 ml. concentrated sulfuric acid. It was cooled and the mixture used in the next step without further purification.

Preparation of 2-amino-4-chloro-5-sulfamylbenzamide, VII

The slurry of methyl-4-chloro-5-sulfamylanthranilate was added to 7 liters of concentrated NH$_4$OH and stirred for 7 days. The reaction mixture was filtered, concentrated on the rotovap to 4 liters and the solid filtered, washed with 400, 200 and 200 ml. portions of water, then with ether. The product was dried in vacuo over P$_2$O$_5$ to give 86% of the product. M.P.=277–9 (dec.).

Preparation of 7'-chloro-6'-sulfamylspiro [cyclopentane-1,2'(1'H)-quinazolin]-4'(3'H)-one, VIII To a suspension of 10 gm. 2-amino-4-chloro-5-sulfamylbenzamide in 100 ml. acetic acid was added 4.1 ml. cyclopentanone and 14 drops of concentrated sulfuric acid. The reaction mixture was stirred at room temperature overnight and filtered. The solid was washed with acetic acid, then ether and dried 6 hours under vacuum at 140° to give 11.8 gm. product. This was dissolved in 500 ml. 95% alcohol, filtered, concentrated to 175 ml. and cooled overnight. The solid was filtered and dried 7 hours in vacuum over $P_2O_5$ at 110° to give about 8 gm. product. M.P.=269–74°.

Calcd (percent): C, 45.64; H, 4.47; Cl, 11.23; N, 13.31; S, 10.15. Found (percent): C, 45.45; H, 4.52; Cl, 11.08, 11.26; N, 13.56; S, 10.31.

EXAMPLE 2

Preparation of 7'-chloro-1-methyl-6'-sulfamylspiro [piperidine-4,2'-(1'H)-quinazolin]-4'(3'H)-one sulfate VIII Synthetic route:

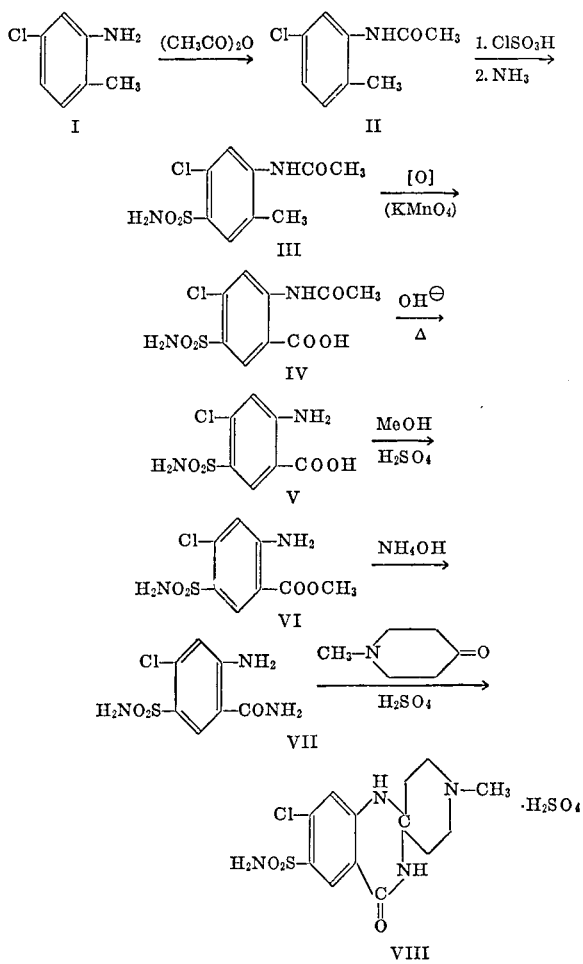

Preparation of 5-chloro-2-methylacetanilide, II 5-chloro-o-toluidine (I), (1000) gm.) was added to 9000 ml. of water, preheated to 35°, in a 4½ gallon battery jar. The slurry was vigorously stirred while 1260 gm. acetic anhydridew as carefully added. Stirring was continued for four hours, then the product was filtered off and air dried. The crude product was recrystallized from 7500 ml. of benzene, using 40 gm. charcoal to remove some colored material. The product was air dried. It weighed 818 gm. and melted at 138–139°. This lot was combined with the material from lot numbers, 741–811, 741–859, 741–874, 745–612, 741–994, and 740–482. The total weight was 11 kg. from 10.4 kg. of starting material.

Preparation of 5-chloro-2-methyl-4-sulfamylacetanilide, III

Chlorosulfonic acid (1000 gm.) was placed in a nitrogen flushed 5 filter, 3 neck round bottom flask fitted with a stirrer anda calcium chloride tube. 5-chloro-2-methylacetanilide (300 gm.) was cautiously added to the chlorosulfonic acid, and then 88 gm. sodium chloride was added portionwise over one hour. The reaction mixture was cautiously raised to 80° C. (foaming occurs). When the foaming had subsided, the temperature was raised to 92° C. and held there for three hours. The hot reaction mixture was added slowly with good agitation to 4000 ml. of acetone and 1500 gm. of ice. The resulting slurry was diluted with water to a total volume of 8000 ml. and the crude sulfonyl chloride was filtered off and washed with water. The damp filter cake was added to 3000 ml. of concentrated ammonium hydroxide, stirred at room temperature for one hour and then heated to 50° C. for two hours. The slurry was cooled, filtered, washed with water and air dried. The weight of product was 186 gm. It melted at 248–250°. This material was combined with that made in runs 741–863, 741–886, 747–505, 747–507, 747–903, and 745–647. The total weight of product was 5 kg. from 11 kg. starting material.

Preparation of N-acetyl-4-chloro-5-sulfamyl anthranilic acid, IV

Into a 12 liter flask was introduced 8000 ml. water, 1144 gm. magnesium sulfate heptahydrate and 400 gm. 5-chloro-2-methyl-4-sulfamylacetanilide. The mixture was heated to 80° and 710 gm. potassium permanganate was added portionwise with good stirring over about four hours at 80–85°. The mixture was kept at 80–85° for three hours after the permanganate addition was completed and then it was filtered hot. The manganese dioxide cake was washed with three 1000 ml. portions of water. The filtrate was made acid with 200 ml. concentrated hydrochloric acid, filtered, washed with water and air dried. The crude product was combined with the crude product obtained from runs 743–858, 747–552, 742–237, 745–685, 747–529, and 740–245, giving a total weight of 2833 gm. This material was dissolved, (under Lot No. 745–687) in 100 liters of 95% ethanol. The resulting solution was concentrated to a total volume of 10 liters, periodically filtering off the product that had crystallized out and washing this with 95% ethanol, The yield of purified product was 2500 gm. melting at 264–266° (from 3 kg. of starting material).

Preparation of 4-chloro-5-sulfamylanthranilic acid, V

N-acetyl - 4 - chloro - 5 - sulfamylanthranilic acid (2500 gm.) was refluxed for three hours in 15,000 ml. 3 N sodium hydroxide solution, then brought to a pH of four with concentrated hydrochloric acid. After allowing it to cool to about 70°, the product was filtered off and washed with water. The wet product was dissolved in 200 liters of boiling water, filtered hot and allowed to cool. When filtered, washed with water and air dried, the product weighed 2000 gm. and melted at 275–276°.

Preparation of methyl-4-chloro-5-sulfamylanthranilate, VI 4-chloro-5-sulfamylanthranilic acid (200 gm.) was refluxed 24 hours in 2 liters methanol and 100 ml. concentrated sulfuric acid. It was cooled and the mixture used in the next step without further purification.

Preparation of 2-amino-4-chloro-5-sulfamylbenzamide, VII

The slurry of methyl-4-chloro-5-sulfamylanthranilate was added to 7 liters of concentrated $NH_4OH$ and stirred for 7 days. The reaction mixture was filtered, concentrated on the rotovap to 4 liters and the solid filtered, washed with 400, 200 and 200 ml. portions of water, then with ether. The product was dried in vacuo over $P_2O_5$ to give 86 gm. of the product. M.P.=277–9 (dec.).

Preparation of 7' - chloro - 1 - methyl - 6' - sulfamyl-spiro [piperidine-4,2'(1'H)-quinazolin]4'(3'H)-one sulfate, VIII To a suspension of 15 gm. 2-amino-4-chloro-5-sulfamylbenzamide in 150 ml. acetic acid was added 7.8 gm. 1-methyl-4-piperidone and 3.5 ml. concentrated sulfuric acid. The mixture was stirred overnight at room temperature, filtered, and the solid washed with acetic acid, then with ether and dried to give 26.5 gm. crude (sulfate salt). The crude product was recrystallized 3 times from water and dried in vacuo over $P_2O_5$ at room temperature to give 11 gm. final product.

EXAMPLE 3

Preparation of 2,2-dimethyl-6-sulfamyl-7-chloro-1,2,3,4-tetrahydro-4-quinazolinone Synthetic route:

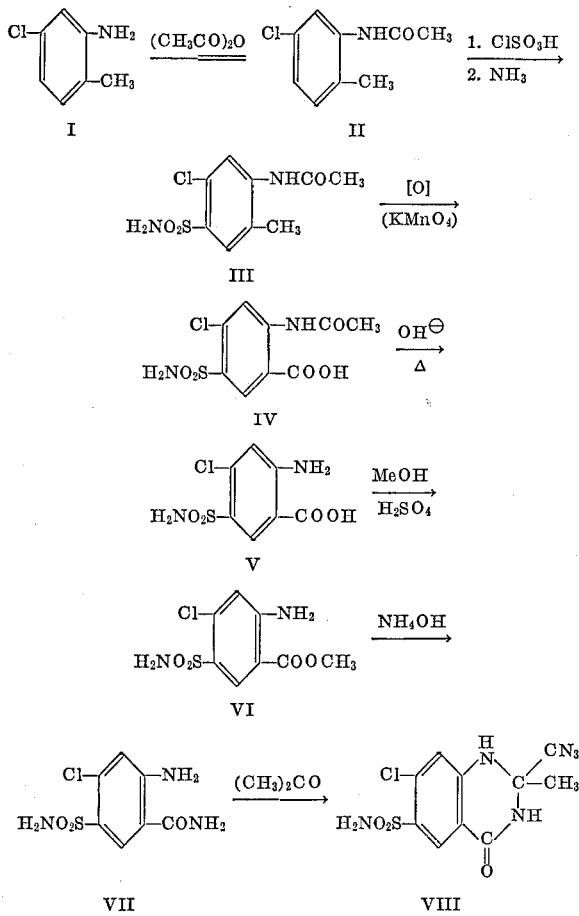

Preparation of 5-chloro-2-methylacetanilide, II 5-chloro-o-toluidine (I), (1000 gm.) was added to 9000 ml. of water, preheated to 35°, in a 4½ gallon battery jar. The slurry was vigorously stirred while 1260 gm. acetic anhydride was carefully added. Stirring was continued for four hours, then the product was filtered off and air dried. The crude product was recrystallized from 7500 ml. of benzene, using 40 gm. charcoal to remove some colored material. The product was air dried. It weighed 818 gm. and melted at 138–139°. This lot was combined with the material from lot numbers, 741–811, 741–859, 741–874, 745–612, 741–994, and 740–482. The total weight was 11 kg. from 10.4 kg. of starting material.

Preparation of 5-chloro-2-methyl-4-sulfamylacetanilide, III

Chlorosulfonic acid (1000 gm.) was placed in a nitrogen flushed 5 liter, 3 neck round bottom flask fitted with a stirrer and a calcium chloride tube. 5-chloro-2-methylacetanilide (300 gm.) was cautiously added to the chlorosulfonic acid, and then 88 gm. sodium chloride was added portionwise over one hour. The reaction mixture was cautiously raised to 80° C. (foaming occurs). When the foaming had subsided, the temperature was raised to 92° C. and held there for three hours. The hot reaction mixture was added slowly with good agitation to 4000 ml. of acetone and 1500 gm. of ice. The resulting slurry was diluted with water to a total volume of 8000 ml. and the crude sulfonyl chloride was filtered off and washed with water. The damp filter cake was added to 3000 ml. of concentrated ammonium hydroxide, stirred at room temperature for one hour and then heated to 50° C. for two hours. The slurry was cooled, filtered, washed with water and air dried. The weight of product was 186 gm. It melted at 248–250°. This material was combined with that made in runs 741–863, 741–886, 747–505, 747–507, 747–903, and 745–647. The total weight of product was 4 kg. from 11 kg. starting material.

Preparation of N-acetyl-4-chloro-5-sulfamyl anthranilic acid, IV

Into a 12 liter flask was introduced 8000 ml. water, 1144 gm. magnesium sulfate heptahydrate and 400 gm. 5-chloro-2-methyl-4-sulfamylacetanilide. The mixture was heated to 80° and 710 gm. potassium permanganate was added portionwise with good stirring over about four hours at 80–85°. The mixture was kept at 80–85° for three hours after the permanganate addition was completed and then it was filtered hot. The manganese dioxide cake was washed with three 1000 ml. portions of water.

The filtrate was made acid with 200 ml. concentrated hydrochloric acid, filtered, washed with water and air dried. The crude product was combined with the crude product obtained from runs 743–858, 747–552, 742–237, 745–685, 747–529, and 740–245, giving a total weight of 2833 gm. This material was dissolved, under Lot #745–687) in 100 liters of 95% ethanol. The resulting filtering off the product that had crystallized out and washing this with 95% ethanol. The yield of purified product was 2500 gm. melting at 264–266°, from 3 kg. of starting material.

Preparation of 4-chloro-5-sulfamylanthranilic acid, V

N-acetyl-4-chloro-5-sulfamylanthranilic acid (2500 gm.) was refluxed for three hours in 15,000 ml. 3 N sodium hydroxide solution, then brought to a pH of four with concentrated hydrochloric acid. After allowing it to cool to about 70°, the product was filtered off and washed with water. The wet product was dissolved in 200 liters of boiling water, filtered hot and allowed to cool. When filtered, washed with water and air dried, the product weighed 2000 gm. and melted at 275–276°.

Preparation of methyl-4-chloro-5-sulfamylanthranilate, VI 4-chloro-5-sulfamylanthranilic acid (200 gm.) was refluxed 24 hours in 2 liters methanol and 100 ml. concentrated sulfuric acid. It was cooled and the resulting mixture was used in the next step without further purification.

Preparation of 2-amino-4-chloro-5-sulfamylbenzamide, VII

The slurry of methyl-4-chloro-5-sulfamylanthranilate was added to 7 liters of concentrated $NH_4OH$ and stirred for 7 days. The reaction mixture was filtered, concentrated on the rotovap to 4 liters and the solid filtered, washed with 400, 200 and 200 ml. portions of water, then with ether. The product was dried in vacuo over $P_2O_5$ to give 86 gm. of the product. M.P.=277–9 (dec.).

Preparation of 2,2-dimethyl-6-sulfamyl-7-chloro-1,2,3,4-tetrahydro-4-quinazolinone, VIII 2-amino-4-chloro-5-sulfamylbenzamide (10 gm.), acetone (10 ml.) and acetic acid (50 ml.) were stirred vigorously at room temperature and 5 drops of concentrated sulfuric acid added. After 1 hour, the solid was filtered, washed with acetic acid, then with ether and dried in vacuo at 105° for 3 hours. The product was dissolved in 20 ml. dimethylformamide, filtered, and 20 ml. hot water added to give 8.0 gm. of the product. M.P. =305–20 (dec.).

Calc. (percent): C, 41.45; H, 4.18; Cl, 12.24; N, 14.50; S, 11.07. Found (percent): 41.28; H, 4.17; Cl, 12.21, 12.36; N, 14.63; S, 11.09.

EXAMPLE 4

Preparation of 2-chloromethyl-2-methyl-6-sulfamyl-7-chloro-1,2,3,4-tetrahydro-4-quinazolinone Synthetic route:

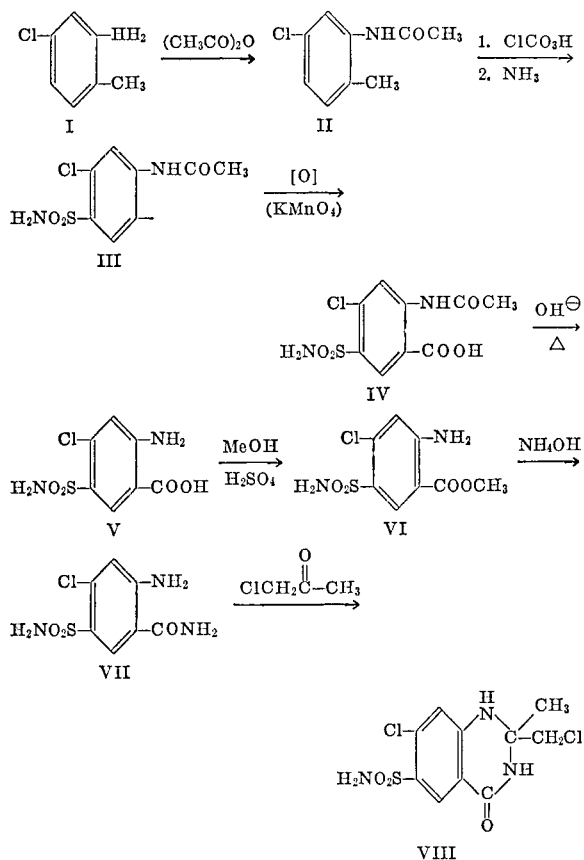

Preparation of 5-chloro-2-methylacetanilide, II 5-chloro-o-toluidine (I), (1000 gm.) was added to 9000 ml. of water, preheated to 35°, in a 4½ gallon battery jar. The slurry was vigorously stirred while 1260 gm. acetic anhydride was carefully added. Stirring was continued for four hours, then the product was filtered off and air dried. The crude product was recrystallized from 7500 ml. of benzene, using 40 gm. charcoal to remove some colored material. The product was air dried. It weighed 818 gm. and melted at 138–139°. This lot was combined with the material from lot numbers, 741–811, 741–859, 741–874, 745–612, 741–994, and 740–482. The total weight was 11 kg. from 10.4 kg. of starting material.

Preparation of 5-chloro-2-methyl-4-sulfamyl-acetanilide, III

Chlorosulfonic acid (1000 gm.) was placed in a nitrogen flushed 5 liter, 3 neck round bottom flask fitted with a stirrer and a calcium chloride tube. 5-chloro-2-methyl-acetanilide (300 gm.) was cautiously added to the chlorosulfonic acid, and then 88 gm. sodium chloride was added portionwise over one hour. The reaction mixture was cautiously raised to 80° C. (foaming occurs). When the foaming had subsided, the temperature was raised to 92° C. and held there for three hours. The hot reaction mixture was added slowly with good agitation to 4000 ml. of acetone and 1500 gm. of ice. The resulting slurry was diluted with water to a total volume of 8000 ml. and the crude sulfonyl chloride was filtered off and washed with water. The damp filter cake was added to 3000 ml. of concentrated ammonium hydroxide, stirred at room temperature for one hour and then heated to 50° C. for two hours. The slurry was cooled, filtered, washed with water and air dried. The weight of product was 186 gm. It melted at 248–250°. This material was combined with that made in runs 741–863, 741–886, 747–505, 747–507, 747–903, and 745–647. The total weight of product was 4 kg. from 11 kg. starting material.

Preparation of N-acetyl-4-chloro-5-sulfamyl anthranilic acid, IV

Into a 12 liter flask was introduced 8000 ml. water, 1144 gm. magnesium sulfate heptahydrate and 400 gm. 5-chloro-2-methyl-4-sulfamylacetanilide. The mixture was heated to 80° and 710 gm. potassium permanganate was added portionwise with good stirring over about four hours at 80–85°. The mixture was kept at 80–85° for three hours after the permanganate addition was completed and then it was filtered hot. The manganese dioxide cake was washed with three 1000 ml. portions of water.

The filtrate was made acid with 200 ml. concentrated hydrochloric acid, filtered, washed with water and air dried. The crude product was combined with the crude product obtained from runs 743–858, 747–552, 742–237, 745–685, 747–529, and 740–245, giving a total weight of 2833 gm. This material was dissolved, (under Lot No. 745–687) in 100 liters of 95% ethanol. The resulting solution was concentrated to a total volume of 10 liters, periodically filtering off the product that had crystallized out and washing this with 95% ethanol. The yield of purified product was 2500 gm. melting at 264–266°, from 3 kg. of starting material.

Preparation of 4-chloro-5-sulfamylanthranicil acid, V

N - acetyl - 4-chloro-5-sulfamylanthranilic acid (2500 gm.) was refluxed for three hours in 15,000 ml. 3 N sodium hydroxide solution, then brought to a pH of four with concentrated hydrochloric acid. After allowing it to cool to about 70°, the product was filtered off and washed with water. The wet product was dissolved in 200 liters of boiling water, filtered hot and allowed to cool. When filtered, washed with water and air dried, the product weighed 2000 gm. and melted at 275–276°.

Preparation of methyl-4-chloro-5-sulfamylanthranilate, VI 4-chloro-5-sulfamylanthranilic acid (200 gm.) was refluxed 24 hours in 2 liters methanol and 100 ml. concentrated sulfuric acid. It was cooled and the mixture used in the next step without further purification.

Preparation of 2-amino-4-chloro-5-sulfamyl-benzamide, VII

The slurry of methyl-4-chloro-5-sulfamylanthranilate was added to 7 liters of concentrated NH₄OH and stirred for 7 days. The reaction mixture was filtered, concentrated on the rotovap to 4 liters and the solid filtered, washed with 400, 200 and 200 ml. portions of water, then with ether. The product was dried in vacuo over P₂O₅ to give 86 gm. M.P.=277–9 (dec.).

Preparation of 2-chloromethyl-2-methyl-6-sulfamyl-7-chloro-1,2,3,4-tetrahydro-4-quinazolinone, VIII 2-amino-4-chloro-5-sulfamylbenzamide (10 gm.), chloro-2-propanone (10 ml.), acetic acid (50 ml.) and concentrated sulfuric acid (6 drops) were heated to 118° over 15 minutes. The temperature maintained for 5 minutes, the mixture cooled and filtered after 1 hour to give 14 gm. product which was dried 5 hours at 100° to give 11.9 gm. M.P.=248–52.

Calc. (percent) C, 37.05; H, 3.42; Cl, 21.88; N, 12.97; S, 9.90. Found (percent): C, 37.02; H, 3.41; Cl, 21.96, 22.01; N, 12.78; S, 9.99.

EXAMPLE 5

Preparation of 7'-chloro-6'-sulfamylspiro [cyclohexane-1,2'(1'H)-quinazolin]-4'(3'H)-one Synthetic route:

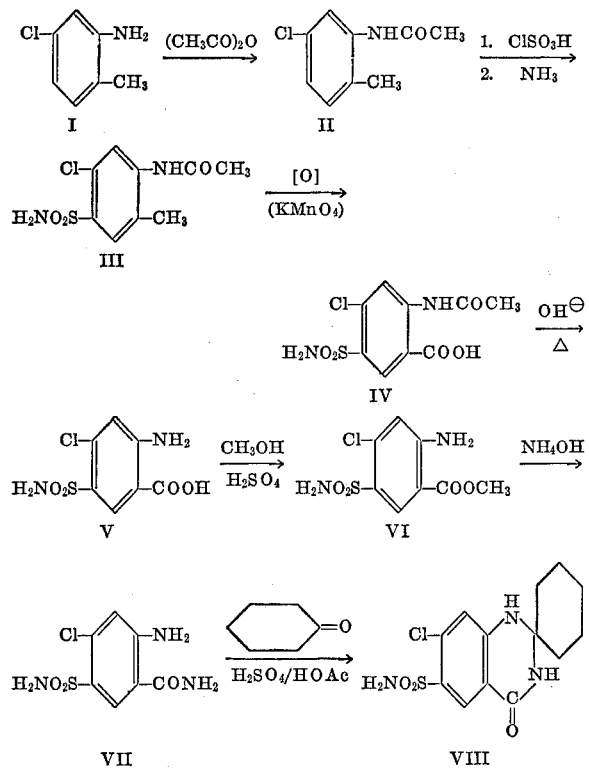

Preparation of 5-chloro-2-methylacetanilide, II 5-chloro-o-toluidine (I), (1000 gm.) was added to 9000 ml. of water, preheated to 35°, in a 4½ gallon batter jar. The slurry was vigorously stirred while 1260 gm. acetic anhydride was carefully added. Stirring was continued for four hours, then the product was filtered off and air dried. The crude product was recrystallized from 7500 ml. of benzene, using 40 gm. charcoal to remove some colored material. The product was air dried. It weighed 818 gm. and melted at 138–139°. This lot was combined with the material from lot numbers, 741–811, 741–859, 741–874, 745–612, 741,994, and 740–482. The total weight was 11 kg. from 10.4 kg. of starting material.

Preparation of 5-chloro-2-methyl-4-sulfamylacetanilide, III

Chlorosulfonic acid (1000 gm.) was placed in a nitrogen flushed 5 liter, 3 neck round bottom flask fitted with a stirrer and a calcium chloride tube. 5-chloro-2-methylacetanilide (300 gm.) was cautiously added to the chlorosulfonic acid, and then 88 gm. sodium chloride was added portionwise over one hour. The reaction mixture was cautiously raised to 80° C. (foaming occurs). When the foaming had subsided, the temperature was raised to 92° C. and held there for three hours. The hot reaction mixture was added slowly with good agitation to 4000 ml. of acetone and 1500 gm. of ice. The resulting slurry was diluted with water to a total volume of 8000 ml. and the crude sulfonyl chloride was filtered off and washed with water. The damp filter cake was added to 3000 ml. of concentrated ammonium hydroxide, stirred at room temperature for one hour and then heated to 50° C. for two hours. The slurry was cooled, filtered, washed with water and air dried. The weight of product was 186 gm. It melted at 248–250°. This material was combined with that made in runs 741–863, 741–886, 747–505, 747–507, 747–903, and 745–647. The total weight of product was 4 kg. from 11 kg. starting material.

Preparation of N-acetyl-4-chloro-5-sulfamyl anthranilic acid, IV

Into a 12 liter flask was introduced 8000 ml. water, 1144 gm. magnesium sulfate heptahydrate and 400 gm. 5-chloro-2-methyl-4-sulfamylacetanilide. The mixture was heated to 80° and 710 gm. potassium permanganate was added portionwise with good stirring over about four hours at 80–85°. The mixture was kept at 80–85° for three hours after the permanganate addition was completed and then it was filtered hot. The manganese dioxide cake was washed with three 1000 ml. portions of water.

The filtrate was made acid with 200 ml. concentrated hydrochloric acid, filtered, washed with water and air dried. The crude product was combined with the crude product obtained from runs 743–858, 747–552, 742–237, 745–685, 747–529, and 740–245, giving a total weight of 2833 gm. This material was dissolved, (under Lot #745–687) in 100 liters of 95% ethanol. The resulting solution was concentrated to a total volume of 10 liters, periodically filtering off the product that had crystallized out and washing this with 95% ethanol. The yield of purified product was 2500 gm. melting at 264–266°, from 3 kg. of starting material.

Preparation of 4-chloro-5-sulfamylanthranilic acid, V

N-acetyl-4-chloro-5-sulfamylanthranilic acid (2500 gm.) was refluxed for three hours in 15,000 ml. 3 N sodium hydroxide solution, then brought to a pH of four with concentrated hydrochloric acid. After allowing it to cool to about 70°, the product was filtered off and washed with water. The wet product was dissolved in 200 liters of boiling water and air dried, the product weighed 2000 gm. and melted at 275–276°.

Preparation of methyl-4-chloro-5-sulfamylanthranilate, VI 4-chloro-5-sulfamylanthranilic acid (200 gm.) was refluxed 24 hours in 2 liters methanol and 100 ml. concentrated sulfuric acid. The mixture was cooled and the mixture used in the next step without further purification.

Preparation of 2-amino-4-chloro-5-sulfamylbenzamide, VII

The slurry of methyl-4-chloro-5-sulfamylanthranilate was added to 7 liters of concentrated $NH_4OH$ and stirred for 7 days. The reaction mixture was filtered, concentrated on the rotovap to 4 liters and the solid filtered, washed with 400, 200, and 200 ml. portions of water, then with ether. The product was dried over $P_2O_5$ to give 86 gm., M.P. 277–9 (dec.).

Preparation of 7'-chloro-6'-sulfamyl-spiro [cyclohexane-1,2'(1'H)-quinazolin]-4'-(3'H)-one, VIII 2-amino-4-chloro-5-sulfamylbenzamide (10 gm.) and 6 ml. cyclohexanone were added to 100 ml. glacial acetic acid. Four drops of concentrated sulfuric acid were added, the mixture stirred 1¼ hours and the solid filtered, washed with acetic, then with ether and dried over $P_2O_5$ under vacuum. The solid was recrystallized from 120 ml. 95% ethanol to give 4.3 gm., M.P. 270–4°.

Calcd. (percent): C, 47.35; H, 4.89; Cl, 10.75; N, 12.74. Found (percent) C, 47.11; H, 4.80; Cl, 10.79; N, 13.03.

The other compounds of this invention can be made by modification of ingredients and quantities of the above example as is well understood by those skilled in the art.

From pharmacology tests and other indications and analogy applicant states that the compounds of this invention are effective diuretics, saluretics, and antihypertensives with low toxicity. For example, the following is a summary of the pharmacology on 7'-chloro-6'-sulfamyl-spiro[cyclopentane-1,2'(1'H)-quinazolin]-4'(3'H)one.

SUMMARY (a) Symptomatology and acute $LD_{50}$ in mice

Orally: $LD_{50} > 1000$ mg./kg. (48 hours) no symptoms at 1000 mg./kg.
Interperitoneal: $LD_{50} > 316$ mg./kg. (48 hours) some hypothermia and decreased spontaneous motor activity at 316 mg./kg.

(b) Cardiovascular in dog

Doses intravenously up to 10 mg./kg. were administered.
There were no changes in the cardiovascular system.

(c) Diuretic assay in rats

When administered by the oral route is initial assays measuring output of urine (ml./kg., $Na^+$, and $Cl^-$ (meq./kg.) at 4 hours and 21 hours after drug administration the said compound was found to promote water and salt loss, has a rapid onset and prolonged action, and appears to have a potency on volume diuresis better than that of quinethazone.

In the preceding specification the temperatures, wherever given, are in degrees centigrade.

Various modifications of the structural formula on page 1 of the specification may be made, such as, for example, has been done for other tetrahydro-7-halo-6-sulfamyl-4-quinazolinones known to the art, without departing from the spirit of the invention which is concerned particularly with the spiro group on the 2-position. However, the CH-substituted groups in the 2-position also have diuretic and saluretic properties when the groups in the other positions are as indicated in the general structural formula, $R'_2$ being preferably hydrogen, loweralkyl, halogen substituted loweralkyl, phenyl, phenylloweralkyl, and $R_2$ being one of said groups of $R'_2$ except hydrogen.

Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

I claim:
1. A compound of the formula

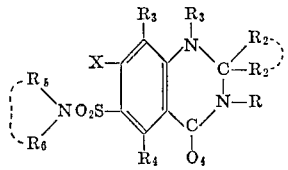

or pharmaceutically acceptable salts thereof, wherein $R_2$ and $R'_2$ together are $C_2$–$C_9$ polymethylene, 3-azapentamethylene, 2-azatetramethylene, or the latter radicals optionally N-substituted with a methyl or phenyl; R is hydrogen or lower alkyl; $R_3$ and $R_4$ are hydrogen, lower alkyl, loweralkoxy, amino, lowerylkylamino, halogen or haloloweralkyl, or phenylloweralkyl; X is halogen or trifluoromethyl; $R_5$ is hydrogen, lower alkyl or phenylloweralkyl; $R_6$ is hydrogen, or loweralkyl or $R_5$ and $R_6$ together with the nitrogen are morpholino, piperidino or pyrrolidino.

2. A compound according to claim 1 wherein $R_2$ and $R'_2$ together are tetramethylene.
3. A compound according to claim 1 wherein $R_2$ and $R'_2$ are 3 azepentamethylene.
4. A compound according to claim 1 in which the compound is 7'-chloro-1-methyl-6'-methylaminosulfonyl-3'-o-tolylspiro-[piperidine-4,2'(1'H)-quinazolin]4'(3'H) - one.
5. A compound according to claim 1 in which the compound is 7'-chloro-1-methyl-6'-methylaminosulfonylspiro [piperidine-4,2'(1'H)-quinazolin]-4'(3'H)-one.
6. A compound according to claim 1 in which the compound is 7' - chloro-6'-methylaminosulfonylspiro [cyclopentane-1,2'(1'H)-quinazolin]-4'(3'H)-one.
7. A compound according to claim 1 in which the compound is 7' - chloro-6'-sulfamylspiro [cyclopentane-1,2'(1'H)-quinazolin]-4'(3'H)-one.
8. A compound according to claim 1 in which the compound is 7'-chloro - 6' - sulfamylspiro [cyclohexane-1,2'(1'H)-quinazolin]4'(3'H)-one.
9. A compound according to claim 1 in which the compound is 7'-chloro-1-methyl-6'-sulfamylspiro [piperidine-4,2'(1'H)-quinazolin]-4'(3'H)-one.
10. A compound according to claim 1 in which the compound is 4,7'-dichloro-6'-sulfamylspiro [cyclohexane-1,2'(1'H)-quinazolin]-4'(3'H)-one.
11. A compound according to claim 1 in which the compound is 7'-chloro-2-mehtyl-6'-sulfamylspiro [cyclohexane-1,2'(1'H)-quinazolin]-4'(3'H)-one.

References Cited
UNITED STATES PATENTS 3,452,019  6/1969  Shetty _____ 260—256.5

ALEX MAZEL, Primary Examiner

R. J. GALLAGHER, Assistant Examiner

U.S. Cl. X.R.

260—247.1; 424—79, 200, 248, 251